(12) United States Patent
Snapp et al.

(10) Patent No.: US 8,305,912 B2
(45) Date of Patent: Nov. 6, 2012

(54) NETWORK AND METHOD PROVIDING AN INDICATION OF NETWORK CAPABILITIES TO A USER FOR SPECIAL NUMBER CALLS

(75) Inventors: John Lawrence Snapp, Westminster, CO (US); Marcus Robert Andronici, Nederland, CO (US); Cynthia Corne, Lafayette, CO (US); Robin Erkkila, Lafayette, CO (US); Bill Hyatt, Longmont, CO (US); John Kearney, Boulder, CO (US); Matt Wilson, Thornton, CO (US)

(73) Assignee: West Corporation, Omaha, NE (US)

( * ) Notice: Subject to any disclaimer, the term of this patent is extended or adjusted under 35 U.S.C. 154(b) by 358 days.

(21) Appl. No.: 12/706,753

(22) Filed: Feb. 17, 2010

(65) Prior Publication Data

US 2010/0142386 A1    Jun. 10, 2010

Related U.S. Application Data

(62) Division of application No. 11/460,761, filed on Jul. 28, 2006, now Pat. No. 7,773,975.

(51) Int. Cl.
*H04L 12/26* (2006.01)

(52) U.S. Cl. ............... 370/250; 370/352; 455/404.2; 379/45

(58) Field of Classification Search .......... 455/404.2, 455/403, 404.1, 412.2, 414.1, 521, 523; 379/37, 379/38, 45; 370/252, 352, 250
See application file for complete search history.

(56) References Cited

U.S. PATENT DOCUMENTS

| | | | |
|---|---|---|---|
| 6,363,138 B1 | 3/2002 | Aprile | |
| 6,526,125 B1 | 2/2003 | Lindsay et al. | |
| 6,650,746 B1 | 11/2003 | Groen et al. | |
| 6,650,901 B1 | 11/2003 | Schuster et al. | |
| 6,665,611 B1 | 12/2003 | Oram et al. | |
| 6,678,357 B2 | 1/2004 | Stumer et al. | |
| 6,744,858 B1 | 6/2004 | Ryan et al. | |
| 6,771,742 B2 | 8/2004 | McCalmont et al. | |
| 6,799,049 B1 | 9/2004 | Zellner et al. | |
| 6,963,557 B2 | 11/2005 | Knox | |
| 7,027,564 B2 * | 4/2006 | James | 379/37 |
| 7,042,985 B1 | 5/2006 | Wright | |
| 7,706,356 B1 * | 4/2010 | Olshansky et al. | 370/352 |
| 2003/0086539 A1 | 5/2003 | McCalmont | |
| 2004/0062231 A1 * | 4/2004 | Wyatt | 370/352 |
| 2004/0190497 A1 | 9/2004 | Knox | |
| 2004/0192271 A1 | 9/2004 | Eisner et al. | |
| 2005/0014482 A1 | 1/2005 | Holland et al. | |
| 2005/0014517 A1 | 1/2005 | Holland et al. | |
| 2005/0020242 A1 | 1/2005 | Holland et al. | |
| 2005/0026589 A1 | 2/2005 | Holland | |
| 2005/0048947 A1 | 3/2005 | Holland | |
| 2005/0063519 A1 | 3/2005 | James | |
| 2005/0083911 A1 | 4/2005 | Grabelsky | |
| 2005/0090225 A1 | 4/2005 | Muechleison | |
| 2005/0175166 A1 | 8/2005 | Welenson et al. | |
| 2005/0190892 A1 | 9/2005 | Dawson et al. | |
| 2005/0195741 A1 | 9/2005 | Doshi | |

(Continued)

*Primary Examiner* — Cong Tran

(57) ABSTRACT

Networks and methods are disclosed for providing an indication of the capability of a communication network for serving special number calls. Before a user places a special number call, the communication network determines the capability of the communication network for serving a special number call, and provides the indication of the network capability to the user. The user is thus kept aware of the quality of the special number service available to them through the communication network.

18 Claims, 5 Drawing Sheets

U.S. PATENT DOCUMENTS

| | | |
|---|---|---|
| 2005/0232164 A1 | 10/2005 | Anzarouth et al. |
| 2005/0243973 A1 | 11/2005 | Laliberte |
| 2006/0049934 A1 | 3/2006 | Breen et al. |
| 2006/0063560 A1* | 3/2006 | Herle .................. 455/552.1 |
| 2006/0068753 A1 | 3/2006 | Karpen et al. |
| 2006/0072547 A1 | 4/2006 | Florkey et al. |
| 2006/0077961 A1 | 4/2006 | Crago et al. |
| 2006/0078095 A1 | 4/2006 | Crago et al. |
| 2006/0099928 A1 | 5/2006 | Conte et al. |
| 2006/0115057 A1 | 6/2006 | Laliberte |
| 2006/0128355 A1 | 6/2006 | Aaron |
| 2006/0245570 A1* | 11/2006 | Pfleging et al. .......... 379/211.02 |
| 2007/0274299 A1* | 11/2007 | Ruckart .................. 370/356 |
| 2007/0280213 A1* | 12/2007 | Sindhwani et al. .......... 370/356 |
| 2008/0013523 A1* | 1/2008 | Nambakkam ................. 370/352 |

* cited by examiner

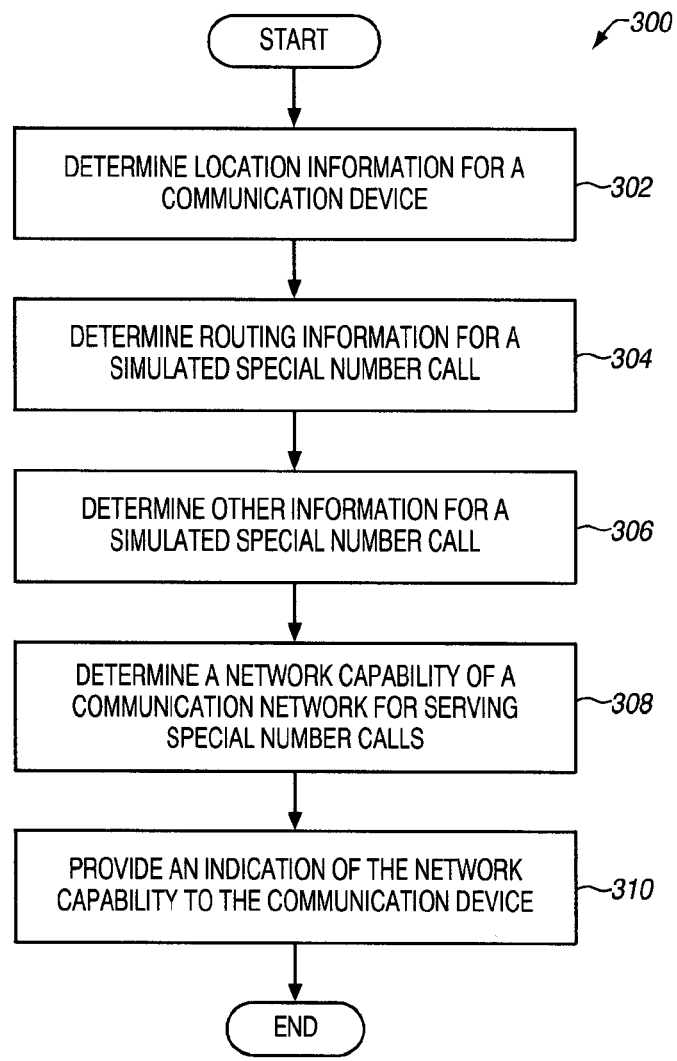
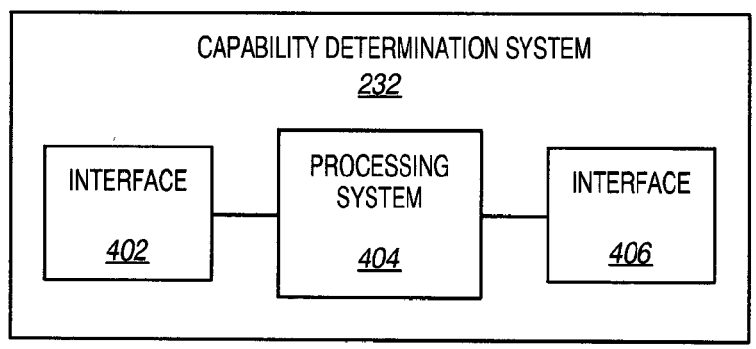

NETWORK AND METHOD PROVIDING AN INDICATION OF NETWORK CAPABILITIES TO A USER FOR SPECIAL NUMBER CALLS

This application is a Divisional Application based upon U.S. patent application Ser. No. 11/460,761 entitled "PROVIDING AN INDICATION OF NETWORK CAPABILITIES TO A USER FOR SPECIAL NUMBER CALLS," filed Jul. 28, 2006, and assigned to the Assignee of the present application.

BACKGROUND OF THE INVENTION

1. Field of the Invention

The invention relates to communications and, in particular, to providing an indication to a user of the capabilities of a communication network for handling special number calls, such as 9-1-1 calls, prior to the user placing a special number call over the communication network.

2. Statement of the Problem

In the United States, basic 9-1-1 service and Enhanced 9-1-1 service (E9-1-1) were developed for landline-based telephony as emergency reporting services where a calling party can dial 9-1-1 in emergency situations. When a 9-1-1 call is placed, the call is answered at a Public Safety Answering Point (PSAP, also known as a "Public Safety Access Point"). An operator at the PSAP converses with the calling party to determine information on the emergency situation. For instance, the operator may ask the calling party for his/her name, the nature of the emergency, the location of the emergency, etc. Based on the gathered information, the operator contacts emergency personnel to respond to the emergency. E9-1-1 has the additional features of automatically providing the operator with some information on the calling party. For instance, E9-1-1 service includes the features of Automatic Number Identification (ANI) and Automatic Location Identification (ALI). With ANI, the operator at the PSAP is automatically provided with the telephone number of the phone placing the 9-1-1 call to allow for call back. With ALI, the PSAP queries an ALI database for information on the physical location of the calling party's phone. An ALI database stores records of telephone numbers with each record containing information on a physical location (such as a street address) corresponding with a telephone number or another key. Responsive to a query from the PSAP, the ALI database returns the location information for the calling party. With the telephone number and the location information, the operator can more effectively handle the 9-1-1 call. Other countries have emergency services similar to this.

E9-1-1 service is more easily implemented for landline phones where a location of a phone is fixed. Mobile devices, such as cell phones, PCS phones, VoIP phones, etc., present another problem. The locations of mobile devices are not fixed by definition, which makes determining their location more of a challenge as compared to landline phones. Regulatory bodies, such as the Federal Communications Commission (FCC) in the United States, have set forth regulations that carrier networks, such as cellular networks, must be able to determine the location of mobile devices for 9-1-1 calls. If a mobile device is GPS enabled, then the device can provide its location to the carrier network. If the mobile device is not GPS enabled, then the carrier network has the duty to determine the location of the mobile device. A wireless carrier network, such as a cellular or PCS network, can estimate the location of a mobile device based on the location of the cell presently providing service to the mobile device, such as through a cell identifier (cell ID). The wireless carrier network may also use triangulation among multiple cells, time of arrival (TOA) information indicating the time it takes for a wireless signal from a mobile device to reach a base station, and other data to more accurately determine the location of the mobile device. The location of the mobile device may then be used to select the appropriate PSAP to handle a 9-1-1 call, and to provide the location of the mobile device to the PSAP.

Mobile VoIP also presents a problem of determining the location of the calling party. Some VoIP service providers have a VoIP user predefine a location, such as his/her home address, when the VoIP user signs up for service. If the VoIP user uses their VoIP phone away from their home address, then the VoIP service provider may require that the VoIP user enter their present address when registering with the VoIP network.

FIG. 1 illustrates a communication network 100 for providing 9-1-1 service in the prior art. Communication network 100 includes a wireless carrier network 110, an emergency services network 120, and a positioning server 132. Wireless carrier network 110 includes a base station 112 and a Mobile Switching Center (MSC) 114 that provide telephone service to a mobile phone 116. Positioning server 132 determines the location of mobile phone 116, and determines where to route 9-1-1 calls based on the location of mobile phone 116. Positioning server 132 may include the functionality of a Location Information Services (LIS) server, a Position Determining Entity (PDE) server, and/or a Serving Mobile Location Center (SMLC) server. Emergency services network 120 includes a selective router 122, a PSAP 124, and an ALI database 126.

The following illustrates a typical 9-1-1 call in communication network 100. Assume that a user of mobile phone 116 places a 9-1-1 call. Base station 112 receives the call, and transmits the call to MSC 114. MSC 114 identifies the call as a 9-1-1 call, and transmits an indication of the 9-1-1 call to positioning server 132. Responsive to the indication of the 9-1-1 call, positioning server 132 determines the location of mobile phone 116. Based on the location of mobile phone 116, positioning server 132 generates routing information for the call in order to route the call to a PSAP responsible for mobile phone 116. The routing information typically includes an Emergency Service Number (ESN) that represents an emergency service zone corresponding with the location of mobile phone 116, an Emergency Service Routing Key (ESRK), and other information. Positioning server 132 then transmits the routing information to MSC 114, which routes the 9-1-1 call to selective router 122 based on the routing information.

Selective router 122 queries a selective router database (not shown) to select the appropriate PSAP 124 to handle the call based on the ESN. Selective router 122 then routes the call to PSAP 124. PSAP 124 receives the call that includes the call back number (ANI) of mobile phone 116 and receives the ESRK. PSAP 124 then queries ALI database 126 based on the ESRK of mobile phone 116 to obtain the present location of mobile phone 116. ALI database 126 communicates with positioning server 132 to obtain the location associated with the ESRK of mobile phone 116. ALI database 126 then provides the location of mobile phone 116 to PSAP 124, and an operator at PSAP 124 handles the 9-1-1 call.

One problem with present communication networks is that a user may be in an area where the 9-1-1 capabilities of the network are poor, and the user may not know that the 9-1-1 capabilities are poor. In one example, a mobile user may travel to an area where a wireless carrier network is not able to accurately determine the location of the mobile user. As a consequence of not being able to accurately determine the location, the wireless carrier network may not be able to determine where to route a 9-1-1 call. Even if the call is routed correctly, a PSAP serving the 9-1-1 call may not receive accurate location information from the ALI database and may have a hard time determining the actual location of the mobile user.

In another example, VoIP service providers sometimes struggle with how to determine the location of VoIP users. Certain areas of VoIP networks are not presently configured to determine the location of a VoIP phone in the event of a 9-1-1 call. Unfortunately, the VoIP user may not have an idea that they are in an area where the VoIP network can only provide limited 9-1-1 capabilities or no 9-1-1 capabilities at all. Similar problems exist for other special number calls or abbreviated dialing calls, such as 1-1-2 calls in Europe.

SUMMARY OF THE SOLUTION

The invention solves the above and other problems by providing an indication of the capability of a communication network to serve a special number call, such as a 9-1-1 call, to a user of a communication device. The communication device may then provide the indication to the user through one or more LEDs, a text message, a web page, interactive voice, etc. The user can advantageously determine the capabilities of the communication network to serve a special number call before a special number call is actually placed over the communication network. The user is thus kept aware of the network capabilities before an emergency situation or other special number situations are encountered.

One embodiment of the invention includes a method of providing the indication of the network capabilities to a user of a communication device. One step of the method includes determining location information for the communication device. Another step of the method includes determining routing information for a simulated special number call to route the simulated special number call to an answering point (e.g., PSAP). Another step of the method includes determining a network capability of the communication network for serving the simulated special number call based on the location information, the routing information, and/or other information. After the network capabilities are determined, another step of the method includes providing an indication of the network capability to the communication device to notify a user of the network capability of the communication network for serving an actual special number call prior to the user placing the actual special number call. For instance, the indication may be "Good", "Average", "Poor", or some other quantifier indicating the network capabilities. The user can advantageously be notified if acceptable network capabilities are available or if poor or no network capabilities are available for special number calls.

The invention may include other exemplary embodiments described below.

DESCRIPTION OF THE DRAWINGS

The same reference number represents the same element or same type of element on all drawings.

FIG. 3 is a flow chart illustrating a method of operating a communication network in an exemplary embodiment of the invention.

FIG. 4 illustrates a capability determination system in an exemplary embodiment of the invention.

DETAILED DESCRIPTION OF THE INVENTION

FIGS. 2-6 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 2:
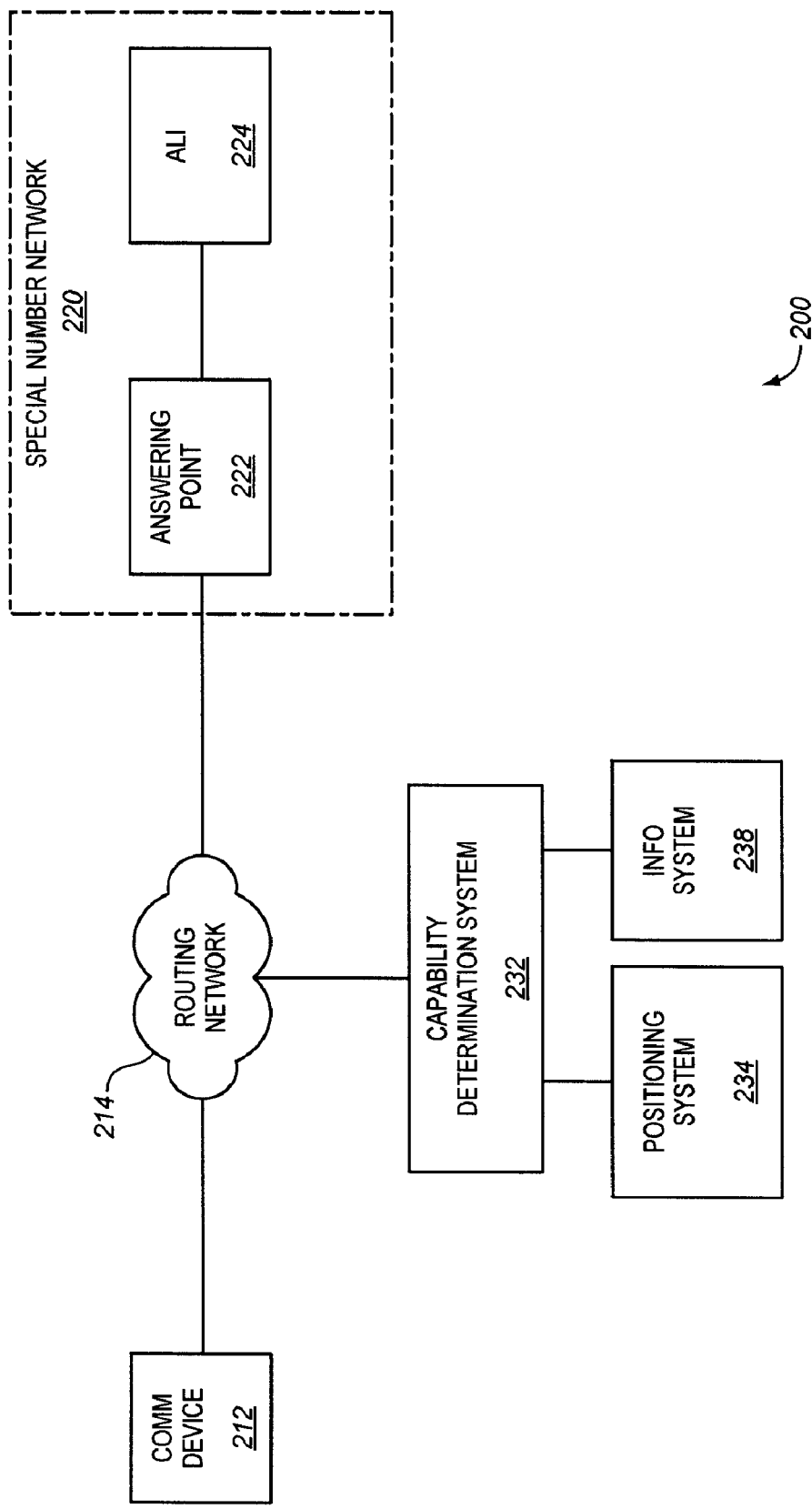
FIG. 2 illustrates a communication network adapted to serve special number calls in an exemplary embodiment of the invention.

FIG. 2 illustrates a communication network 200 adapted to serve a special number call in an exemplary embodiment of the invention. Special number calls, also referred to as abbreviated number calls, are calls to particular numbers where the communication network provides a special service to the calling party. Examples of special number calls include 9-1-1 calls in the United States, and 1-1-2 calls in Europe. Communication network 200 is illustrated as including a communication device 212, a routing network 214, and a special number network 220. Communication device 212 comprises any device adapted to place a special number call to special number network 220, such as a landline phone, a mobile phone, a VoIP phone, etc. Routing network 214 comprises any network that provides communication between communication device 212 and another network, system, or device. Routing network 214 may be a circuit-switched network or a packet-based network. Special number network 220 comprises any network adapted to serve a special number call or abbreviated number call in some manner. One example of a special number network 220 is an emergency services network adapted to serve emergency calls, such as 9-1-1 calls. Special number network 220 includes an answering point 222 adapted to receive the special number calls, and an ALI database 224 adapted to provide location information to answering point 222.

Figure 1:
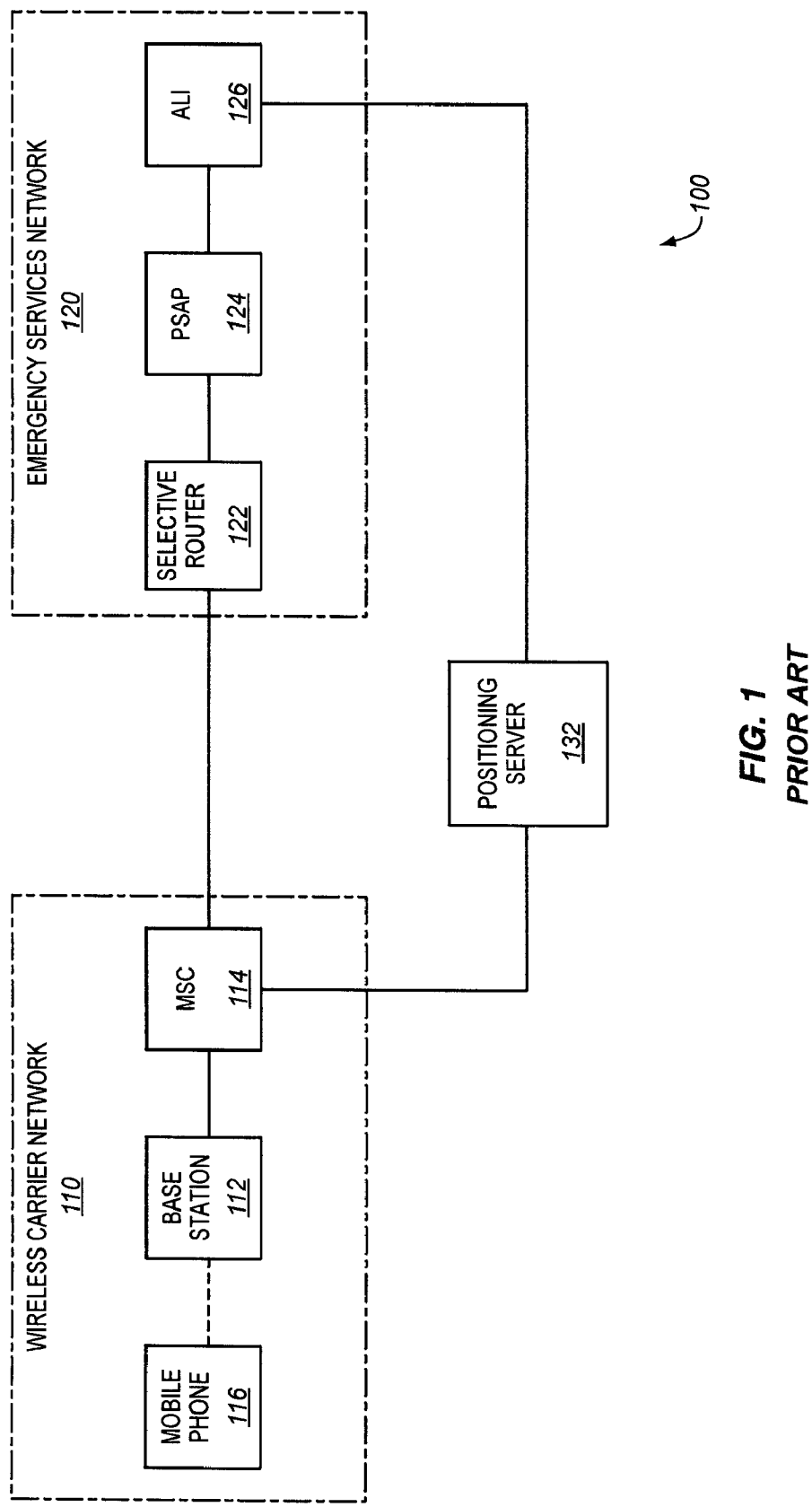
FIG. 1 illustrates a communication network for providing 9-1-1 service in the prior art.

Communication network 200 is further illustrated as including a capability determination system 232, a positioning system 234, and an information system 238. Capability determination system 232 comprises any system, server, or application adapted to determine the capability of a communication network to serve a special number call as will be described in more detail herein. In making this determination, capability determination system 232 may receive data or information from positioning system 234, information system 238, and/or other systems not shown in FIG. 1.

Positioning system 234 comprises any system, server, or application adapted to determine or identify location information for a communication device, and to determine or identify routing information for a special number call. Examples of positioning system 234 may include a mobile positioning center (MPC), a VoIP positioning center (VPC), a Location Information Services (LIS) server, a Position Determining Entity (PDE) server, a Serving Mobile Location Center (SMLC) server, a switch, a static mapping table that maps user identifiers (i.e., directory numbers) to physical addresses, etc.

Information system 238 comprises any system, server, or application adapted to determine or identify some other type of information for a special number call. Capability determination system 232 may process location information and routing information from positioning system 234, or other information from other systems. Information system 238 represents any other system or systems that generate information used by capability determination system 232 to determine the capability of a communication network to serve a special number call.

Prior to a user of communication device 212 placing a special number call, communication network 200 operates as described in FIG. 3 to determine the capability of communication network 200 to serve a special number call. In other words, communication network 200 determines its capability not in response to the user of communication device 212 placing a special number call, but rather determines its capability responsive to some other trigger. The trigger may be communication device 212 registering with capability determination system 232, communication device 212 registering with a carrier network (not shown) for communication device 212, capability determination system 232 detecting movement of communication device 212 over a particular threshold, a time period expiring, or another type of trigger.

FIG. 3 is a flow chart illustrating a method 300 of operating communication network 200 in an exemplary embodiment of the invention. The steps of the flow chart in FIG. 3 are not all inclusive and may include other steps not shown.

In step 302, positioning system 234 determines location information for communication device 212. The location information may include a physical location of communication device 212, such as a street address, a latitude/longitude, etc. The location information may also include an uncertainty of the physical location of communication device 212, where the uncertainty indicates how accurate or precise the physical location is for communication device 212. For instance, an indication of "10" may indicate that positioning system 234 is confident in the reliability of the location of communication device 212. An indication of "1" may indicate that positioning system 234 is not confident in the reliability of the location of communication device 212. The uncertainty may be generated as part of a triangulation algorithm, or may be generated in other desired ways.

Positioning system 234 may determine the location information in a variety of ways. In one example, if communication device 212 is a wireline phone, then positioning system 234 may include a table that maps physical addresses to directory numbers. In another example, if communication device 212 is a wireless phone, then positioning system 234 may determine the location of communication device 212 based on GPS information, triangulation among multiple cells, time of arrival (TOA) information, or other data. In another example, if communication device 212 is a VoIP phone, then positioning system 234 may determine the location of communication device 212 based on an address specified by the user upon setup of the VoIP service, based on an address entered by the user when communication device 212 registers with a carrier network, etc.

In step 304, positioning system 234 determines routing information for a simulated special number call from communication device 212 to route the simulated special number call to answering point 222. Positioning system 234 determines the routing information based on the location of communication device 212 and other information. Because an actual special number call has not been placed at this time, positioning system 234 determines routing information for a "simulated" special number call to mimic how an actual special number call would be routed for communication device 212. The routing information may indicate an Emergency Service Zone (ESZ), an Emergency Service Number (ESN), or any other information to route the special number call to the appropriate answering point.

In step 306, information system 238 determines other information for a simulated special number call from communication device 212. Depending on the network capabilities that are to be determined, capability determination system 232 may receive data from positioning system 234 and/or information system 238. Information system 238 is intended in this embodiment to provide any other information that capability determination system 232 may need or want to determine the network capability. As an example, information system 238 may provide an indication that a wireless carrier network is a Phase 0 network, a Phase 1 network, or a Phase 2 network. In another example, information system 238 may provide an indication of the capability of answering point 222 for handling special number calls.

In step 308, capability determination system 232 determines a network capability of communication network 200 for serving special number calls, such as the simulated special number call, based on the location information provided by positioning system 234, based on the routing information provided by positioning system 234, and/or based on other information provided by information system 238. The network capability represents the level or quality of special number service that communication network 200 could provide communication device 212 for a special number call.

In one example, capability determination system 232 may process the location information to identify a location of communication device 212 and an uncertainty of the location of communication device 212. Capability determination system 232 may further determine the network capability of communication network 200 based on the location of communication device 212 and the uncertainty of the location.

In another example, capability determination system 232 may identify an answering point 222 for the simulated special number call and an amount of data that can be provided to answering point 222. Capability determination system 232 may further determine the network capability of communication network 200 based on the identified answering point 222 and the amount of data that can be provided to answering point 222.

In another example, capability determination system 232 may determine if a call back number is identified for the simulated special number call, and determine the network capability of communication network 200 based on whether a call back number is identified.

In another example, capability determination system 232 may identify an answering point 222 to handle the simulated special number call, and determine the capabilities of answering point 222 to handle the simulated special number call. Capability determination system 232 may further determine the network capability of communication network 200 based on the capabilities of answering point 222. For instance, the capabilities of answering point 222 may include whether answering point 222 can provide a physical address to an operator or can provide a latitude/longitude to an operator. The capabilities of answering point 222 may include what type of data that answering point 222 can handle or process, such as video, text messages, etc. Capability determination system 232 may query a database that stores information on each answering point in communication network 200 to determine the capabilities of answering point 222. Capability determination system 232 may process any other desired information to determine the network capability.

In step 310, capability determination system 232 provides an indication of the network capability to communication device 212 to notify the user of the network capability of communication network 200 for serving an actual special number call. Capability determination system 232 provides this indication prior to the user placing an actual special number call so that the user is aware of the capability of communication network 200 for serving special number calls. The indication of the network capability may take on many desired forms, such as a signal intended to illuminate one or more LEDs on communication device 212, a text message, a web page, an interactive voice message, etc. Responsive to receiving the indication, communication device 212 displays or otherwise provides the indication of the network capability to the user to notify the user of the network capability prior to the user placing an actual special number call.

According to method 300, communication network 200 advantageously keeps the user of communication device 212 aware of its capability to serve special number calls. This can particularly be advantageous for mobile users, such as cellular users or VoIP users. Because the capabilities of VoIP networks to serve special number calls are presently an issue, method 300 provides an effective mechanism to keep users aware of the capability of a VoIP network to handle special number calls.

FIG. 4 illustrates capability determination system 232 in an exemplary embodiment of the invention. Capability determination system 232 includes a first interface 402 adapted to communicate with communication device 212, a processing system 404, and a second interface 406 adapted to communicate with positioning system 234 and/or information system 238. Processing system 404 comprises any circuitry, logic, single processing device, or a group of inter-operational processing devices operable to execute code or instructions. Processing system 404 may execute one or more algorithms to determine the network capability of communication network 200 to serve special number calls.

When in operation, interface 406 receives location information, routing information, and/or other information from positioning system 234 and/or information system 238. Processing system 404 processes the location information, the routing information, and/or the other information to determine a network capability of communication network 200 for serving special number calls. Interface 402 then provides an indication of the network capability to communication device 212 to notify the user of the network capability of communication network 200 for serving an actual special number call.

Figure 5:
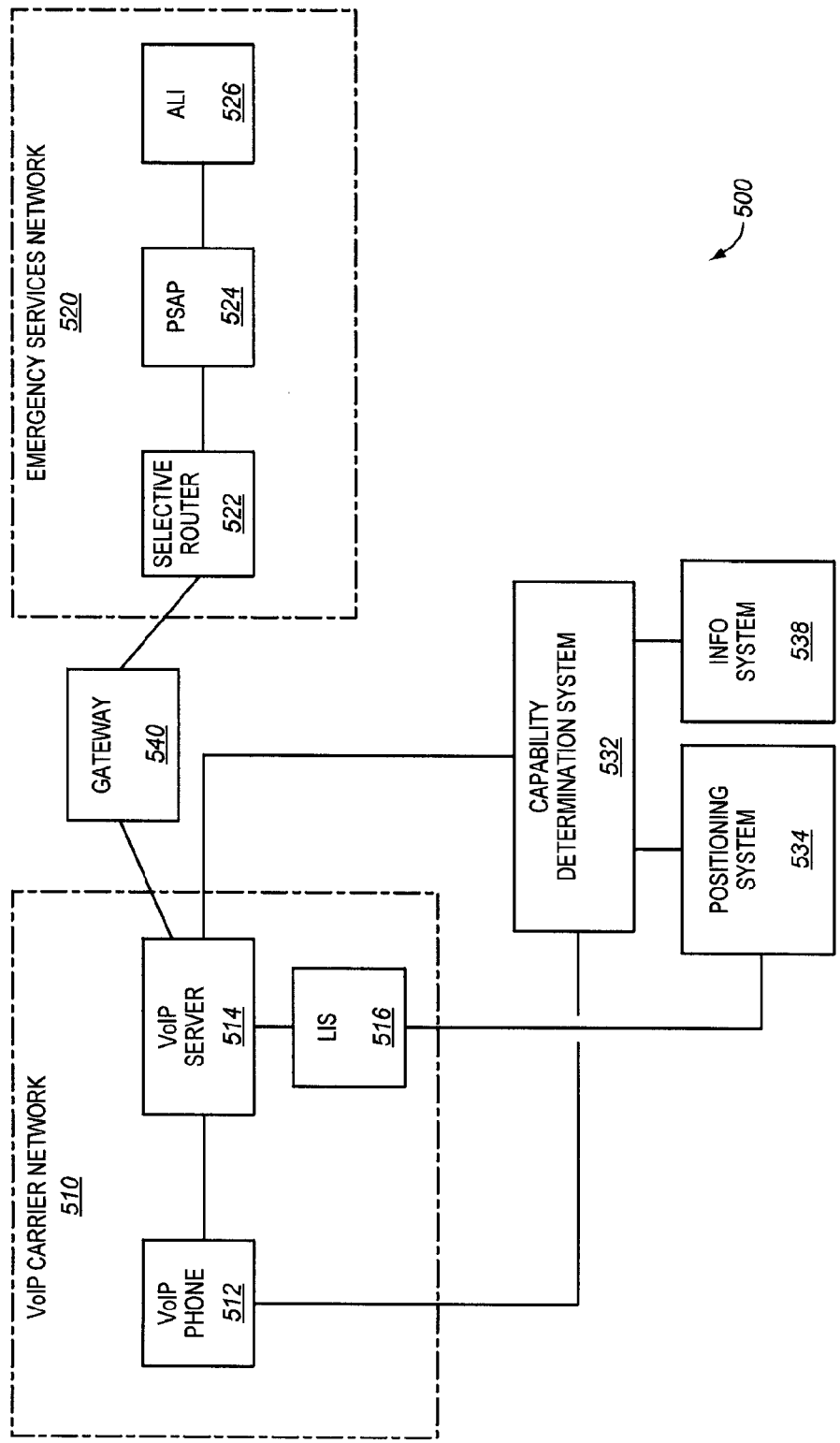
FIG. 5 illustrates another communication network adapted to serve an emergency call in an exemplary embodiment of the invention.

FIG. 5 illustrates another communication network 500 adapted to serve an emergency call in an exemplary embodiment of the invention. An emergency call may comprise a 9-1-1 call in the United States, a 1-1-2 call in Europe, or another type of emergency call. Although emergency calls are illustrated in this embodiment, communication network 500 may serve other types of special number calls or abbreviated number calls in a similar manner.

In this embodiment, communication network 500 includes a VoIP carrier network 510, an emergency services network 520, and a gateway 540 between the networks. VoIP carrier network 510 includes a VoIP phone 512, a VoIP server 514, and a LIS 516. Emergency services network 520 includes a selective router 522, a PSAP 524, and an ALI database 526. Communication network 500 is further illustrated as including a capability determination system 532, a positioning system 534, and an information system 538.

When in operation, VoIP phone 512 registers with VoIP server 514. VoIP phone 512 may use Session Initiation Protocol (SIP) to register and communicate with VoIP server 514. LIS 516 stores location information for VoIP phone 512. The location information may be pre-defined for VoIP phone 512 as a static location, or may be defined by the user of VoIP phone 512 during registration. Responsive to the registration of VoIP phone 512, VoIP server 514 transmits a message to capability determination system 532, which is a trigger for capability determination system 532 to initiate the process of determining the capability of communication network 500 to serve an emergency call. VoIP server 514 also transmits a query or message to positioning system 534 and/or information system 538 as is done for an actual emergency call even though an emergency call has not been placed by VoIP phone 512. VoIP server 514 initiates the process of serving an emergency call, but the call is a simulated emergency call.

Positioning system 534 receives the query from VoIP server 514 and determines location information for VoIP phone 512 (if available). For instance, positioning system 534 may query LIS 516 to identify the location of VoIP phone 512. Positioning system 534 may also query LIS 516 for an uncertainty of the location, or generate an uncertainty. If positioning system 534 identifies a location for VoIP phone 512, then positioning system 534 may query the user of VoIP phone 512 to verify the identified location, especially if the uncertainty of the location indicates that the location may be suspect. For instance, positioning system 534 may transmit a web page, a text message, or some other type of information that includes an address identified for the user to VoIP phone 512. If the address is correct, then the user can verify that the address is correct. If the location is incorrect, then the user can either indicate that the address is incorrect or enter the correct address. In another instance, positioning system 534 may transmit a web page, a text message, or some other type of information to VoIP phone 512 that includes a map indicating the identified location for the user. If the location on the map is correct, then the user can verify that the identified location is correct. If the location on the map is incorrect, then the user can either indicate that the location is incorrect or indicate the correct location on the map. Either way, positioning system 534 has a verified location for the user of VoIP phone 512.

If positioning system 534 is not able to identify a location for VoIP phone 512, then positioning system 534 may query the user of VoIP phone 512 to provide their present location. For instance, positioning system 534 may transmit a web page, a text message, or some other type of information asking the user to enter his/her present location. Positioning system 534 can then store the provided location information.

Positioning system 534 then processes the location information of VoIP phone 512 to determine routing information for the simulated emergency call. The routing information indicates which PSAP 524 is appropriate to serve the emergency call. Each PSAP in the emergency services network 520 is assigned to an emergency service zone. Positioning system 534 identifies the emergency service zone associated with the location of VoIP phone 512, and assigns an Emergency Service Query Key (ESQK) for the simulated emergency call that is associated with the identified emergency service zone. The ESQK is dynamically assigned to the emergency call to enable routing to the proper PSAP and enable retrieval of a call back number and the location information. Positioning system 534 then transmits the location information and the routing information to capability determination system 532. Information system 538 may provide other information to capability determination system 532 as needed or desired.

Capability determination system 532 determines a network capability of communication network 500 for serving the simulated emergency call based on the location information provided by positioning system 534, based on the routing information provided by positioning system 534, and/or based on other information provided by information system 538. The network capability represents the level or quality of emergency service that communication network 500 could provide VoIP phone 512 for an emergency call.

As an example, the network capability may depend on the precision of the location identified for VoIP phone 512, such as a state, a county, a city, a street address, latitude/longitude, etc. The network capability may depend on whether positioning system 534 can identify a PSAP for the simulated emergency call. The network capability may depend on whether a call back number can be identified for the simulated emergency call. The network capability may depend on whether a dedicated trunk is down or congested between gateway 540 and selective router 522, or between selective router 522 and PSAP 524. The network capability may depend on the capabilities of PSAP 524 to handle an emergency call. For instance, the capabilities of PSAP 524 may include whether PSAP 524 can provide a physical address to an operator or can provide a latitude/longitude to an operator. The capabilities of PSAP 524 may include what type of data that PSAP 524 can handle or process, such as video, text messages, etc. There may be many other factors that capability determination system 532 considers in determining the network capability.

Capability determination system 532 then provides an indication of the network capability to VoIP server 514, and VoIP server 514 forwards the indication to VoIP phone 512. Capability determination system 532 may alternatively provide the indication directly to VoIP phone 512. Capability determination system 532 provides this indication prior to the user placing an actual emergency call so that the user is aware of the capability of communication network 500 for serving emergency calls.

The network capability may be a grade such as "Good", "Average", or "Poor". VoIP phone 512 may have three LEDs (green/yellow/red) associated with the grades "Good", "Average", and "Poor". When VoIP phone 512 receives the indication of network capability from capability determination system 532, VoIP phone 512 can illuminate the proper LED to indicate the grade of network capability.

The VoIP service provider may also use the network capability to restrict communication service to VoIP phone 512. The VoIP service provider may define capability standards for serving emergency calls that VoIP network 510 has to meet before service is provided to VoIP phone 512. If the network capability does not meet the defined capability standards, then VoIP server 514 may restrict the VoIP service to VoIP phone 512. As an example, if capability determination system 532 determines that a location for VoIP 512 cannot be identified or that the precision or certainty of the location is not acceptable, then capability determination system 532 indicates this in the network capability determination, such as giving a "Poor" grade. The VoIP service provider may define that a location of VoIP phone 512 has to be determined with an acceptable precision before VoIP server 514 is allowed to provide VoIP service to VoIP phone 512.

Figure 6:
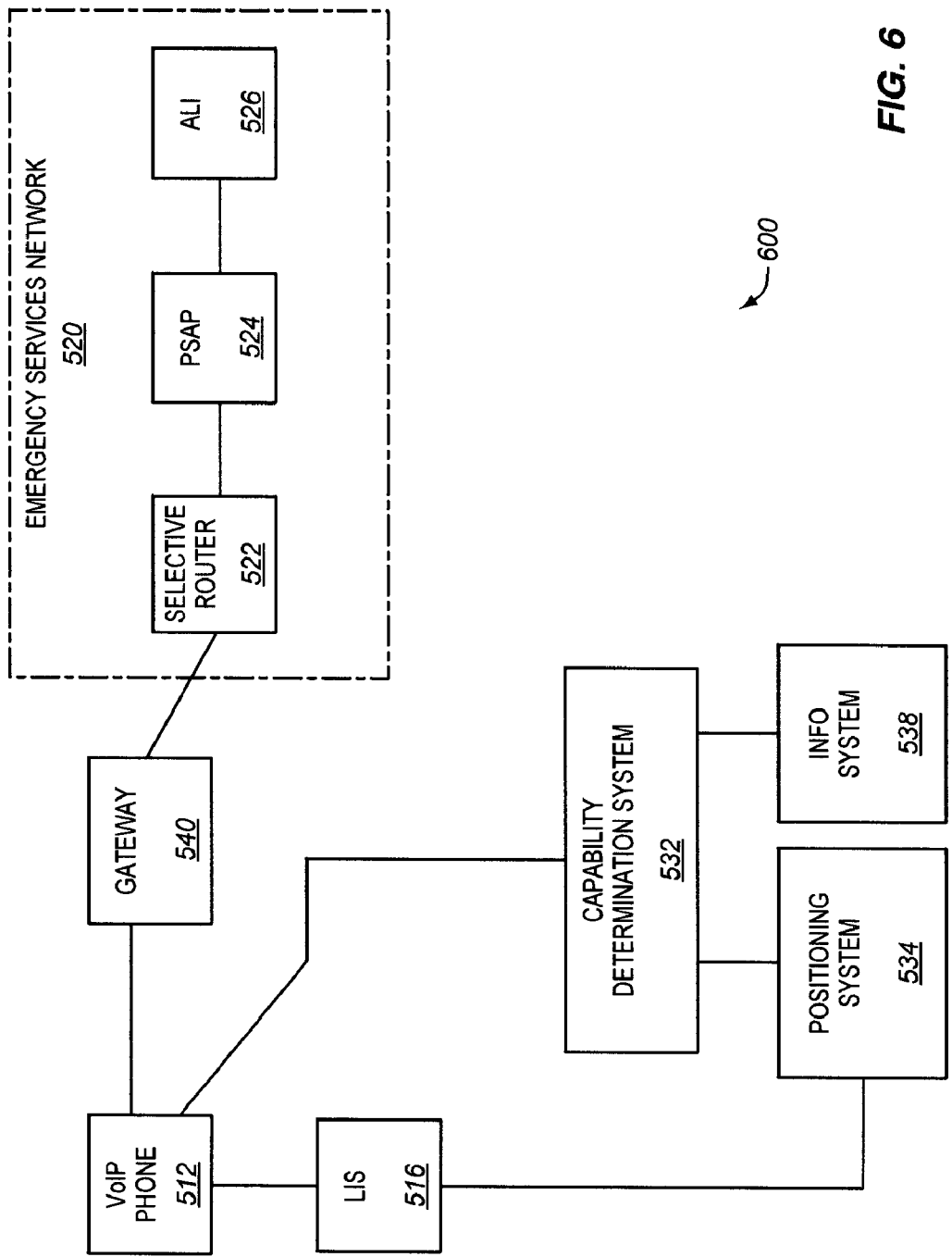
FIG. 6 illustrates another communication network adapted to serve an emergency call in an exemplary embodiment of the invention.

FIG. 6 illustrates another communication network 600 adapted to serve an emergency call in an exemplary embodiment of the invention. Communication network 600 is substantially similar in configuration and operation as communication network 500, except that there is peer-to-peer communication between VoIP phone 512 and emergency services network 520. In this embodiment, VoIP phone 512 is a peer-to-peer device that subscribes to an emergency call service, such as a 9-1-1 service in the United States.

Although specific embodiments were described herein, the scope of the invention is not limited to those specific embodiments. The scope of the invention is defined by the following claims and any equivalents thereof.

We claim:

1. A method of providing an indication of the capability of a communication network to serve special number calls before special number calls are placed over the communication network, the method comprising:
   determining location information for a VoIP device of a user being served by a VoIP network;
   determining routing information for a simulated special number call to route the simulated special number call from the VoIP device through the VoIP network to an answering point;
   determining a network capability of the communication network for serving special number calls from the VoIP device based on at least the location information and the routing information; and
   providing an indication of the network capability to the VoIP device to notify the user as to the network capability of the communication network for serving an actual special number call prior to the user placing the actual special number call.

2. The method of claim 1 wherein determining a network capability of the communication network comprises:
   processing the location information to identify a location of the VoIP device and an uncertainty of the location of the VoIP device; and
   determining the network capability of the communication network based on the location of the VoIP device and the uncertainty of the location.

3. The method of claim 1 wherein determining a network capability of the communication network comprises:
   identifying an answering point for the simulated special number call and an amount of data that can be provided to the identified answering point; and
   determining the network capability of the communication network based on the identified answering point and the amount of data that can be provided to the identified answering point.

4. The method of claim 1 wherein determining a network capability of the communication network comprises:
   determining if a call back number is identified for the simulated special number call; and
   determining the network capability of the communication network based on whether the call back number is identified.

5. The method of claim 1 wherein determining a network capability of the communication network for serving the simulated special number call comprises:
   identifying an answering point to handle the simulated special number call;
   determining the capabilities of the answering point to handle the simulated special number call; and
   determining the network capability of the communication network based on the capabilities of the identified answering point.

6. The method of claim 1 wherein the steps of the method are initiated responsive to the VoIP device registering with the VoIP network.

7. The method of claim 1 further comprising:
receiving the indication of the network capability in the VoIP device; and
displaying the indication of the network capability to the user to notify the user of the network capability prior to the user placing an actual special number call.

8. The method of claim 7 wherein displaying the indication of the network capability comprises at least one of illuminating an LED, displaying a web page, or displaying a text message.

9. The method of claim 1 further comprising:
restricting VoIP service to the VoIP device responsive to the network capability not meeting defined capability standards.

10. The method of claim 1 wherein the special number call comprises a 9-1-1 call.

11. A communication network adapted to provide an indication of the capability of a communication network to serve special number calls before special number calls are placed over the communication network, the communication network comprising:
a VoIP server adapted to provide VoIP service to a VoIP device;
a positioning system adapted to determine location information for the VoIP device of a user, and to determine routing information for a simulated special number call to route the simulated special number call from the VoIP device through the VoIP server to an answering point; and
a capability determination system adapted to determine a network capability of the communication network for serving special number calls from the VoIP device based on at least the location information and the routing information, and to provide an indication of the network capability to the VoIP device to notify the user as to the network capability of the communication network for serving an actual special number call prior to the user placing the actual special number call.

12. The communication network of claim 11 wherein the capability determination system is further adapted to:
process the location information to identify a location of the VoIP device and an uncertainty of the location of the VoIP device; and
determine the network capability of the communication network based on the location of the VoIP device and the uncertainty of the location.

13. The communication network of claim 11 wherein the capability determination system is further adapted to:
identify an answering point for the simulated special number call and an amount of data that can be provided to the identified answering point through the VoIP network; and
determine the network capability of the communication network based on the identified answering point and the amount of data that can be provided to the identified answering point.

14. The communication network of claim 11 wherein the capability determination system is further adapted to:
determine if a call back number is identified for the simulated special number call; and
determine the network capability of the communication network based on whether the call back number is identified.

15. The communication network of claim 11 wherein the capability determination system is further adapted to:
identify an answering point to handle the simulated special number call;
determine the capabilities of the answering point to handle the simulated special number call; and
determine the network capability of the communication network based on the capabilities of the identified answering point.

16. The communication network of claim 11 wherein the capability determination system is further adapted to determine the network capability responsive to the VoIP device registering with the VoIP server.

17. The communication network of claim 11 wherein the VoIP server is further adapted to:
restrict VoIP service to the VoIP device responsive to the network capability not meeting defined capability standards.

18. The communication network of claim 11 wherein the special number call comprises a 9-1-1 call.

* * * * *